US007080710B2

(12) United States Patent
Kwon et al.

(10) Patent No.: US 7,080,710 B2
(45) Date of Patent: Jul. 25, 2006

(54) WHEELCHAIR CONTROL SENSOR USING MOVEMENT OF SHOULDERS AND WHEELCHAIR DRIVE CONTROL APPARATUS USING THE SAME

(75) Inventors: Dong Soo Kwon, Daejeon (KR); Kyoo Bin Lee, Gangwon-do (KR); Jae Woong Min, Daejeon (KR); Soo Chul Lim, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 378 days.

(21) Appl. No.: 10/748,433

(22) Filed: Dec. 30, 2003

(65) Prior Publication Data

US 2004/0216943 A1 Nov. 4, 2004

(30) Foreign Application Priority Data

Mar. 26, 2003 (KR) ...................... 10-2003-0018856

(51) Int. Cl.
*B62D 11/00* (2006.01)

(52) U.S. Cl. ....................................... 180/316; 180/907

(58) Field of Classification Search ................ 180/316, 180/907, 65.1, 6.5

See application file for complete search history.

(56) References Cited

U.S. PATENT DOCUMENTS

| | | | | | |
|---|---|---|---|---|---|
| 3,374,845 | A | * | 3/1968 | Selwyn | 180/6.5 |
| 4,078,627 | A | * | 3/1978 | Brown et al. | 180/6.5 |
| 4,093,037 | A | | 6/1978 | Miller, III | |
| 4,207,959 | A | * | 6/1980 | Youdin et al. | 180/167 |
| 4,260,035 | A | | 4/1981 | Loveless et al. | |
| 4,281,734 | A | * | 8/1981 | Johnston | 180/167 |
| 4,486,630 | A | * | 12/1984 | Fetchko | 200/52 R |
| 4,679,644 | A | * | 7/1987 | Loveless | 180/6.5 |

* cited by examiner

*Primary Examiner*—Paul N. Dickson
*Assistant Examiner*—Tiffany Webb
(74) *Attorney, Agent, or Firm*—Graybeal Jackson Haley LLP

(57) ABSTRACT

The present invention is a wheelchair control sensor for controlling a powered wheelchair for spinal cord-injured persons, who are incapable of using their hands, using movement of shoulders. The wheelchair control sensor includes two shoulder straps, two casings, two Force Sensitive Resistor (FSR) sensors, pressing balls, and a waist belt. The casings each have an internal space defined by an inclined surface. The FSR sensors are attached to the inclined surfaces of the casings or surfaces opposite to the inclined surfaces. The pressing balls are connected to the shoulder straps to press the FRS sensors while being moved through the internal spaces of the casings by external force. The waist belt is worn on an upper garment with the two casings spaced apart from each other at a certain interval.

4 Claims, 13 Drawing Sheets

WHEELCHAIR CONTROL SENSOR USING MOVEMENT OF SHOULDERS AND WHEELCHAIR DRIVE CONTROL APPARATUS USING THE SAME

This application claims priority from Korean Patent Application No. 10-2003-0018856 filed 26 Mar. 2003, which is herein incorporated by reference.

FIELD OF THE INVENTION

The present invention relates generally to a wheelchair control sensor for a user who are incapable of moving their hands, and more particularly, to a wheelchair control sensor capable of controlling a powered wheelchair using the movement of the shoulders of spinal cord-injured persons Additionally, the present invention relates to an apparatus that controls the operation of a wheelchair using the wheelchair control sensor.

BACKGROUND OF THE INVENTION

Most of spinal cord-injured persons, who are incapable of moving their hands, cannot drive wheelchairs but utilize wheelchairs with the aid of assistants. Furthermore, it is difficult to acquire wheelchairs equipped with control units that can be used by spine cord-injured persons. Currently, there are few wheelchairs that can be used by spine cord-injured persons who are incapable of moving their hands.

For wheelchairs for handicapped persons, there have been proposed a wheelchair that can be controlled in such a way that a contact type or contactless type switch is mounted on a headrest and the movement of the head of a handicapped person is measured another type of wheelchair has a joystick mounted near the chin of a handicapped person and the joystick is controlled by the chin.

For example, U.S. Pat. No. 4,093,037 entitled "Head actuated control unit for battery-powered wheelchair" discloses a technique of controlling a wheelchair through the movement of the head of a handicapped person. A joystick is mounted on a headrest and a handicapped person controls the joystick by moving his or her head. Furthermore, an on/off switch is mounted on the headrest and a wheelchair is turned on/off in case of necessity.

U.S. Pat. No. 4,260,035 entitled "Chin controller system for powered wheelchair" discloses a technique of controlling a wheelchair by controlling a joystick using the chin of a handicapped person. This patent is constructed in such a way that an angle sensor is positioned behind the neck of a handicapped person and the angle sensor is connected to the chin of a handicapped person with a long bar. When a handicapped person moves his or her chin, the angle of the bar that is rotated according to the movement of the chin is measured, and a wheelchair is controlled according to the measured angle. For example, when a handicapped person moves his or her chin in a vertical direction, a wheelchair is controlled to move in forward and backward directions. In contrast, when the handicapped person moves his or her chin in a horizontal direction, the wheelchair is controlled to move in a lateral direction.

Although wheelchairs using the patented techniques have been marketed, most of handicapped persons feel uncomfortable about putting on a special apparatus that is not used by normal persons. Handicapped persons tend not to use wheelchairs equipped with control units that are exposed to the views of other persons. Further, the prior art technology is inconvenient in that handicapped persons control joysticks by moving their chins, or handicapped persons control joysticks mounted on headrests by moving their heads.

SUMMARY OF THE INVENTION

It is, therefore, an object of the present invention to provide a wheelchair control sensor, which is worn on the upper body of a spine cord-injured person who is incapable of moving his and her hands, measures the direction and amount of the movement of the shoulders and controls a powered wheelchair, thereby conveniently controlling the powered wheelchair without being concerned about its appearance.

Another object of the present invention is to provide an apparatus for controlling the driving of a powered wheelchair, which is capable of conveniently controlling the powered wheelchair using the wheelchair control sensor.

In order to accomplish the above object, the present invention provides a wheelchair control sensor for controlling a powered wheelchair for a user who is incapable of using their hands, comprising: two casings each including an internal space having an inclined surface; two force sensitive resistor (FSR) sensors attached to the inclined surfaces of the casings or surfaces opposite to the inclined surfaces; pressing balls to press the FRS sensors while being moved through the internal spaces of the casings by external forces; two shoulder straps for providing the external forces to the pressing balls according to movements of the user's shoulders; and a waist belt worn on an upper body of the user with the two casings spaced apart from each other at a certain interval.

In addition, a wheelchair drive control apparatus of the present invention is characterized by receiving a detection signal from a wheelchair control sensor, which controls a powered wheelchair for spinal cord-injured persons using the movement of the shoulders, and controlling operation of wheels of the powered wheelchair.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
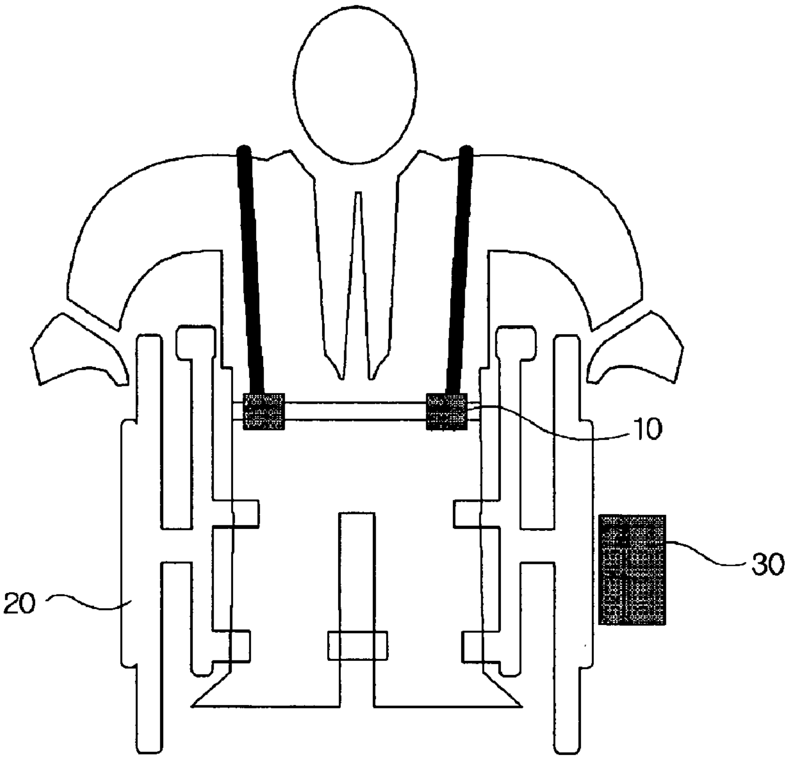
FIG. 1 is a schematic diagram illustrating spatial relationships between a wheelchair control sensor configured to detect the movement of the shoulders, a spine cord-injured handicapped person, and a control unit mounted on a powered wheelchair in accordance with the present invention.

Reference now should be made to the drawings, in which the same reference numerals are used throughout the different drawings to designate the same or similar components.

A wheelchair control sensor using the movement of the shoulders in accordance with a preferred embodiment of the present invention and an apparatus for controlling the driving of a wheelchair using the wheelchair control sensor are described in detail with reference to the appended drawings.

FIG. 1 is a schematic diagram illustrating spatial relationships between a wheelchair control sensor configured to detect the movement of the shoulders, a spine cord-injured handicapped person, and a control unit mounted on a powered wheelchair in accordance with the present invention.

As shown in FIG. 1, a wheelchair control sensor 1 is constructed to be worn on the upper garment of a handicapped person and detect the movement of one or both shoulders of the handicapped person. A control unit 30 is mounted on a powered wheelchair 20 to receive detection signals from the wheelchair control sensor 10 in a wired manner and control both wheels of the powered wheelchair 20. The direction of the powered wheelchair 20 of FIG. 1 is controlled in such a way that the control unit 30 receives the detection signals from the wheelchair control sensor 10 and performs control.

Figure 2A:
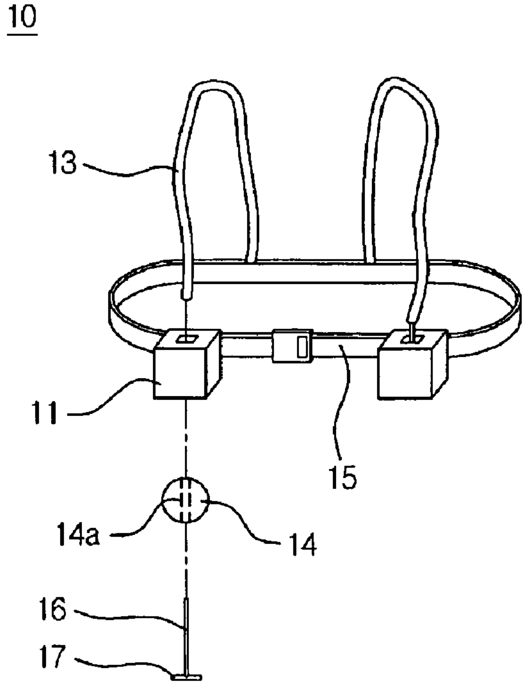
FIGS. 2*a* and 2*b* are an exploded perspective view of the wheelchair control sensor and a view of an assembled wheelchair control sensor, respectively.
Figure 2B:
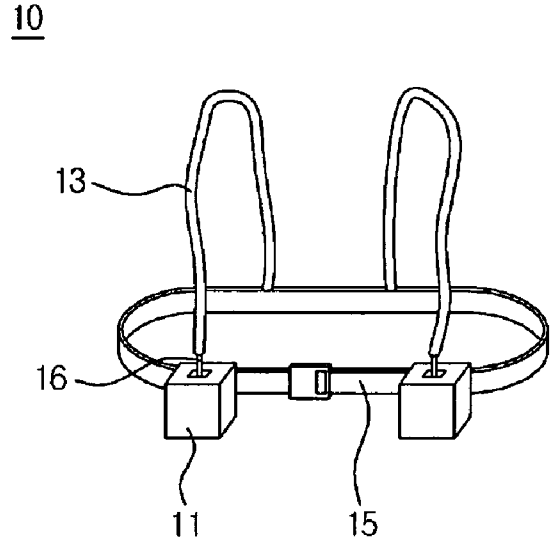
Figure 3:
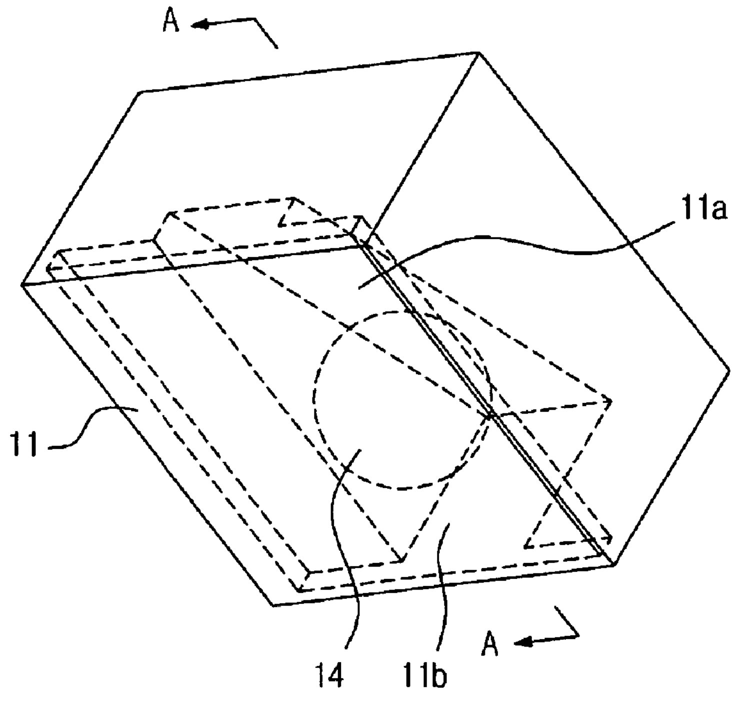
FIG. 3 is a see-through view showing the inside structure of the casing of the wheelchair control sensor of FIG. 2*b;*
Figure 4:
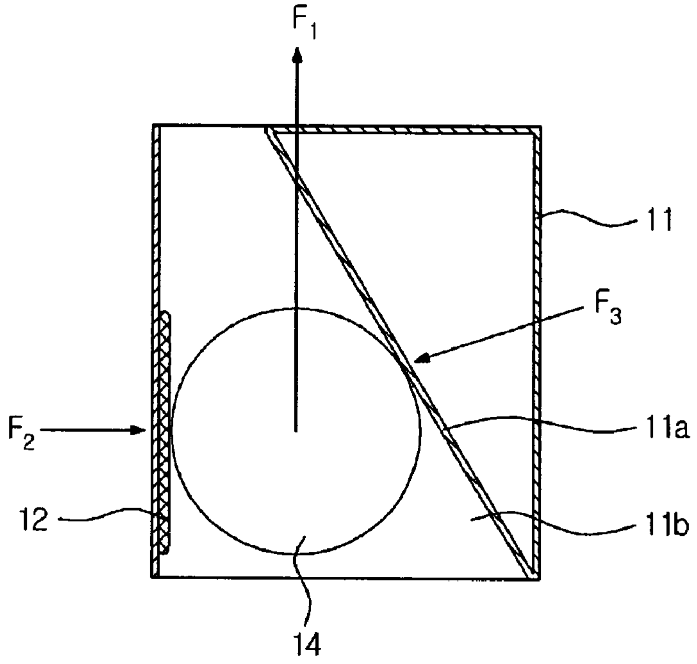
FIG. 4 is a sectional view taken along line A—A of FIG. 3, showing the principle of the sensor of FIG. 2*b;*

FIG. 3 is a see-through view showing the inside structure of the casing of the wheelchair control sensor of FIG. 2*b*. FIG. 4 is a sectional view taken along line A—A of FIG. 3, showing the principle of the sensor of FIG. 2*b*.

As shown in FIGS. 2*a* and 2*b*, the wheelchair control sensor 10 in accordance with the present invention includes two casings 11 each having an internal space 11*b* defined by an inclined surface 11*a*, two force sensitive resistor (FSR) sensors 12 attached to the inclined surfaces 11*a* of the casings 11 or surfaces opposite to the inclined surfaces 11*a*, pressing balls 14 connected to shoulder straps 13 to press the FSR sensors 12 while being moved upward and downward through the internal spaces 11*b* of the casings 11 by external force, and a waist belt 15 worn on an upper garment with the two casings 11 spaced apart from each other at a certain interval so that the pressing balls 14 can press the FSR sensors 12 while being moved upward and downward by the action of the shoulder straps 13.

Each of the casings 11 has a cubic or hexahedral shape, and is provided with the internal space 11*b* that has a inclined surface 11*a* having a uniform width and a descending inclination. The inclined surface 11*a* is formed to have the descending inclination forward top portion of the internal space 11*b*. Accordingly, the part of the upper portion of the internal space 11*b* is narrower than that of the lower portion of the internal space 11*b*. The internal space 11*b* is sized so that the pressing ball 14 does not escape from the internal space 11*b* through the upper end of the internal space 11*b* after being inserted into therein through the lower end of the internal space 11*b*.

The FSR sensor 12 may be attached to the inclined surface 11*a* of the casing 11 or a surface opposite to the inclined surface 11*a*. A connection line connected to an end of the FSR sensor 12 is exposed to the outside of the casing 11 so that signals output from the FSR sensor 12 can be input to the control unit 30. The FSR sensor 12 is a thin film-shaped pressure sensor, and a variable sensor having characteristics in that, as the external force exerted thereon increases, the resistance value thereof becomes smaller. For example, if it is assumed that force exerted thereon is F, the resistance value R can be approximated to be "$aF^b$." In this case, "a" and "b" are constants related to the characteristics of the FSR sensor 12 and an area on which the external force is exerted, respectively.

The pressing ball 14 is constructed in the form of a sphere having certain size and weight. A through hole 14*a* is formed through the center line of the pressing ball 14, and a wire 16 is inserted into the through hole 14*a*. The wire 16 is connected at one end thereof to a stopper 17 having a diameter larger than that of the through hole 14*a* and at the other end thereof to the shoulder straps 13. Accordingly, the pressing ball 14 is moved according to the movement of the shoulder straps 13.

Additonally, the waist belt 15 is constructed not only to connect the two casings 11 with a certain interval (generally, narrower than the distance of an adult's shoulders) interposed therebetween, but also to allow the casings 11 to be worn on an upper garment. That is, the waist belt 15 not only allows the two casings 11 to be spaced apart from each other so as to position the two shoulder straps on the user's shoulders, respectively, but also makes the two casings 11 secured to the upper garment without displacement even though there is movement in the shoulders. Accordingly, the waist belt 15 may be constructed in various forms, provided that it can secure the casings 11 to the upper garment without displacement.

Each of the shoulder straps 13 is secured to a support portion at a first end thereof so that the pressing ball 14 connected to a second end of each shoulder strap 13 presses the FSR sensor 12 while being moved along the inclined surface 11*a*. For example, the second end of each shoulder strap 13 may be provided with a clip to allow the second end of each shoulder strap 13 to be secured to the upper garment, or may be directly fixed to the waist belt 15, as shown in FIGS. 2*a* and 2*b*. As described above, the shoulder straps 13 may be secured to any of various portions, provided that the pressing balls 14 can press the FSR sensors 12 while moving along the inclined surfaces 11*a* of the casings 11 according to the movement of the shoulders.

A principle of controlling a powered wheelchair using the wheelchair control sensor of the present invention, which is constructed as described above, is described below.

Figure 5:
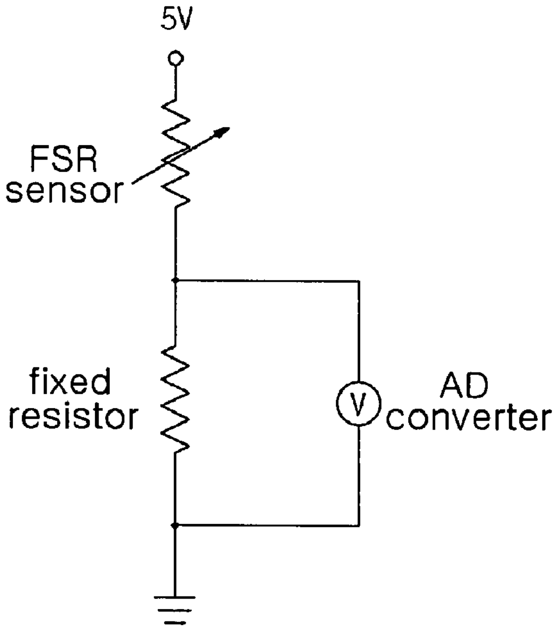
FIG. 5 is a circuit diagram showing a principle of detecting the resistance value of the wheelchair control sensor of the present invention using a control unit.

FIG. 4 is a sectional view taken along line A—A of FIG. 3, showing the principle of the sensor of FIG. 2*b*. FIG. 5 is a circuit diagram showing a principle of detecting the resistance value of the wheelchair control sensor of the present invention using a control unit.

As shown in FIG. 4, when a handicapped person wearing the wheelchair control sensor 10 of the present invention raises one or both of his or her shoulders, one or both of the shoulder straps 13 located on one or both shoulders raised are moved and, therefore, one or both of the pressing balls 14 press one or both of the FSR sensors 12 while being moved through the internal spaces 11*b* of the casings 11. Force equal to reaction force $F_2$ and force equal to reaction force $F_3$ are exerted on each FSR sensor 12 and the inclined surface 11*a*, respectively, by the action of tension $F_1$ exerted by the shoulder strap 13. The force exerted on the FSR sensor 12 through the pressing ball 14 varies according to the extent to which the shoulder is raised. Since the FSR sensor 12 is a variable resistor, the resistance value decreases in proportion to the magnitude of the tension $F_1$ exerted by the shoulder strap 13.

In the wheelchair control sensor 10 of the present invention, the FSR sensors 12 are positioned in the two casings 11, respectively, and the resistance values of the FSR sensors 12 vary according to the magnitude of tensions F1 exerted on the FSR sensors 12 (that is, the extent to which the shoulders are raised), thus being capable of controlling the direction of the powered wheelchair using the resistance values.

The resistance values of the FSR sensors 12 are transmitted to the control unit 30 through a voltage divider. As illustrated in FIG. 5, a fixed resistor is grounded, and Vcc of 5 V is applied to the FSR sensor 12. In this case, when weak force is applied to the FSR sensor 12, the resistance value of the FSR sensor 12 becomes larger and, thus, low voltage is transmitted to the Analog to Digital (AD) converter. In contrast, when strong force is applied to the FSR sensor 12, the resistance value of the FSR sensor 12 becomes smaller and, thus, high voltage is transmitted to the control unit 30. The control unit 30 controls the direction of the powered wheelchair according to the transmitted signal.

The direction of the powered wheelchair that is controlled by the wheelchair control sensor of the present invention is described below.

Figure 6:
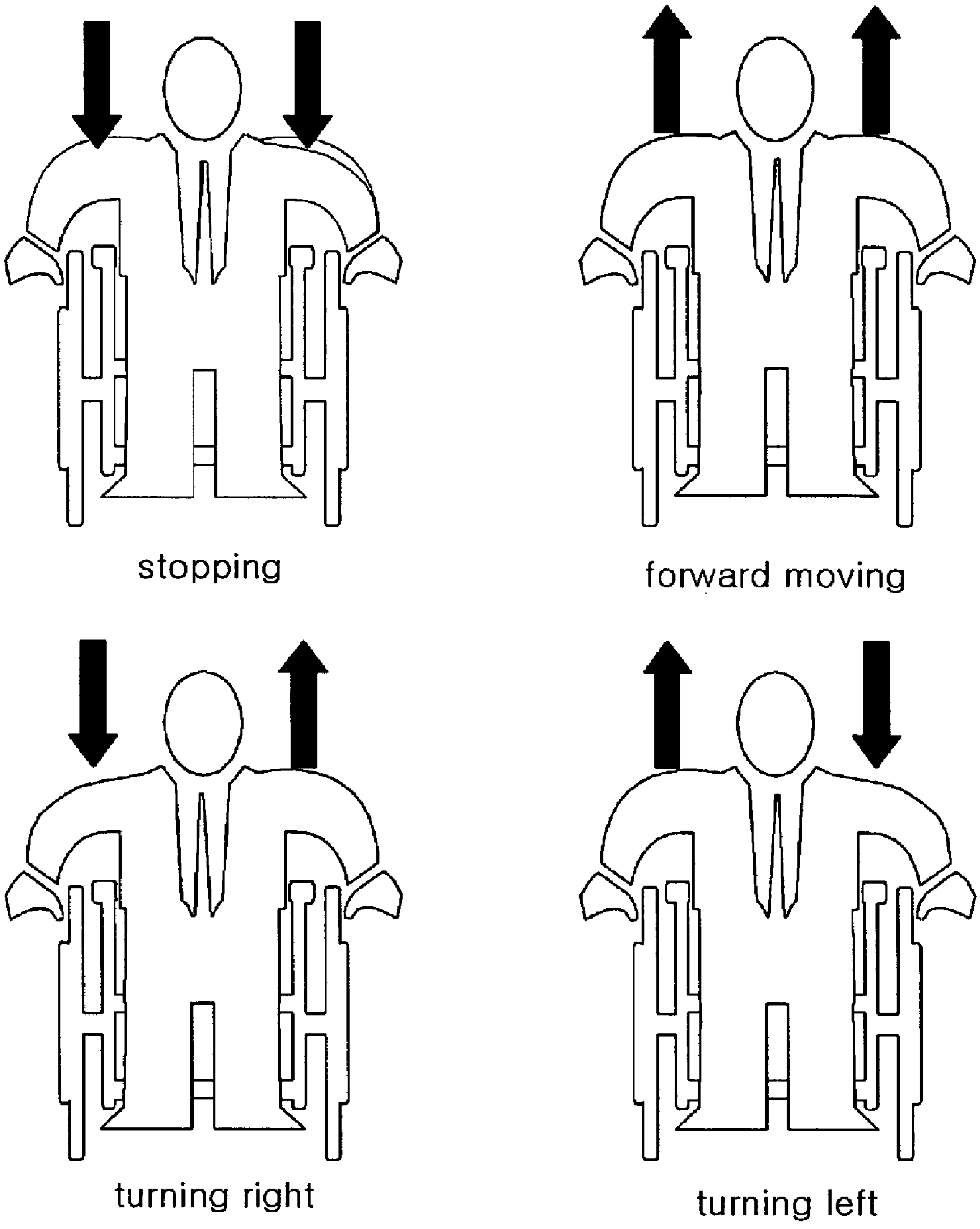
FIG. 6 is a conceptual diagram illustrating the direction of the powered wheelchair that is controlled by the wheelchair control sensor of the present invention.

FIG. 6 is a conceptual diagram illustrating the direction of the powered wheelchair that is controlled by the wheelchair control sensor of the present invention. As shown in FIG. 6, the wheelchair is operated according to the movement of a handicapped person wearing the wheelchair control sensor 10 of the present invention, as described below. The wheelchair turns to the left when the handicapped person raises the right shoulder, turns to the right when the handicapped person raises the left shoulder, moves forward when the handicapped person raises both shoulders, and stops or remains stopped when the handicapped person lowers both shoulders. This operational principle is determined based on the phenomenon in which, when a driver rotates the steering wheel of a car, the right shoulder of the driver is raised at the time of turning to the left, and the left shoulder of the driver is raised at the time of turning to the right.

Furthermore, the wheelchair of the present invention moves backward when both shoulders are quickly raised two times. In accordance with the present invention, turning and forward movement can be performed at the same time. For example, when the left shoulder is fully raised and the right shoulder is half raised, the wheelchair moves forward while turning to the right.

Figure 7A:
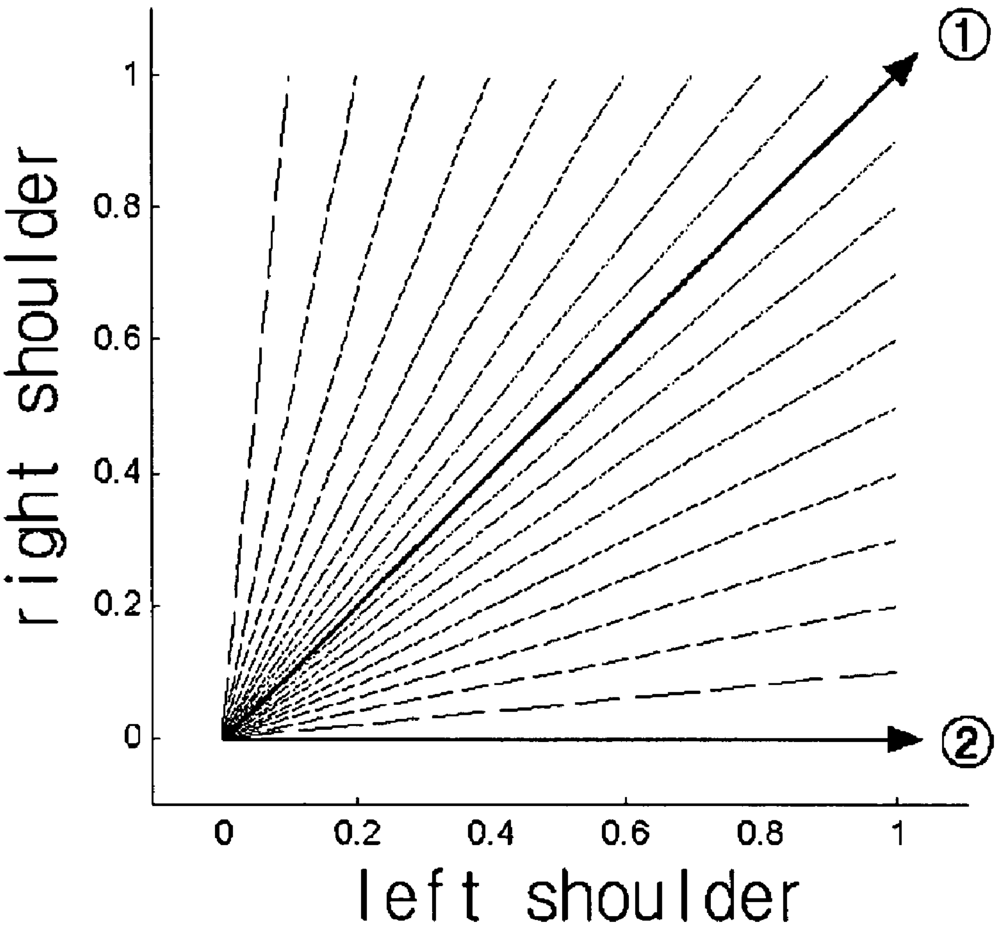
FIGS. 7*a*, 7*b* and 7*c* are graphs that compare a functional relationship for converting the movement of the shoulders detected by the wheelchair control sensor of the present invention into the movement of a wheelchair and a conversional relationship for a joystick.
Figure 7B:
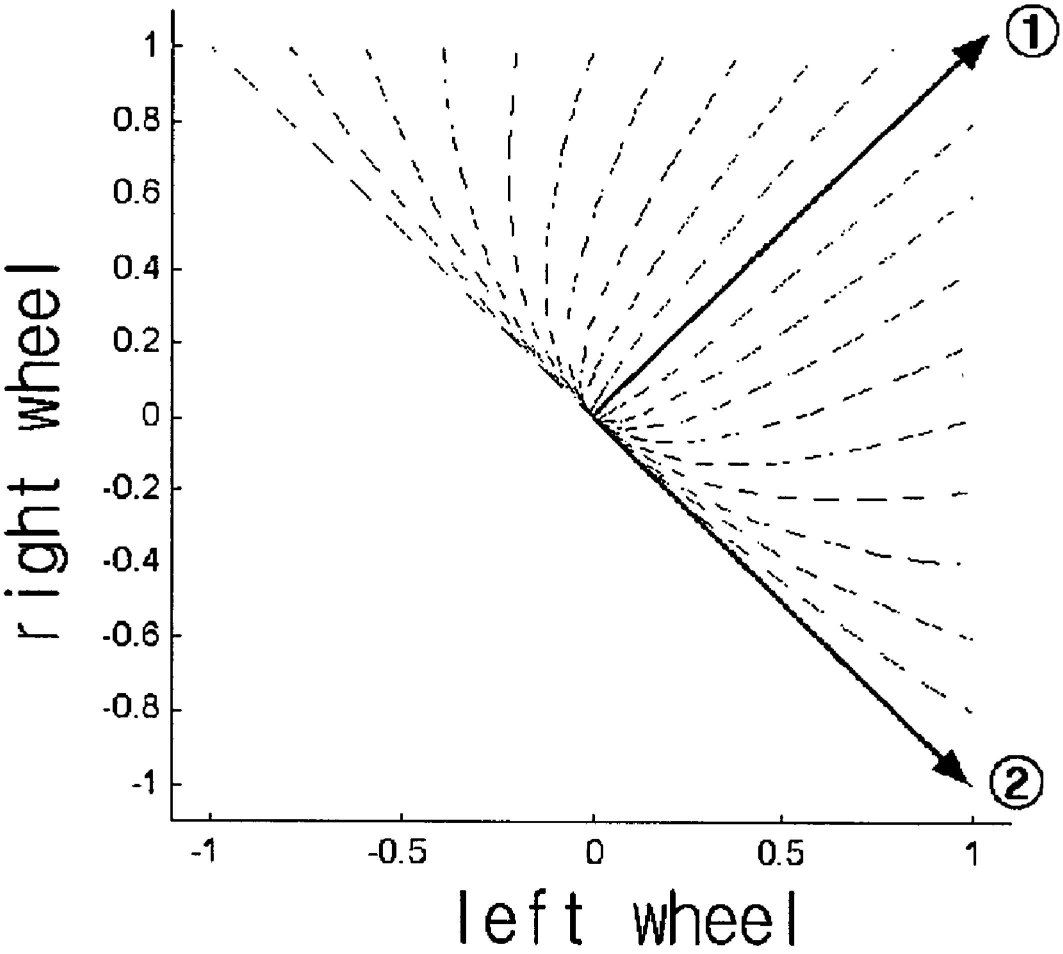
Figure 7C:
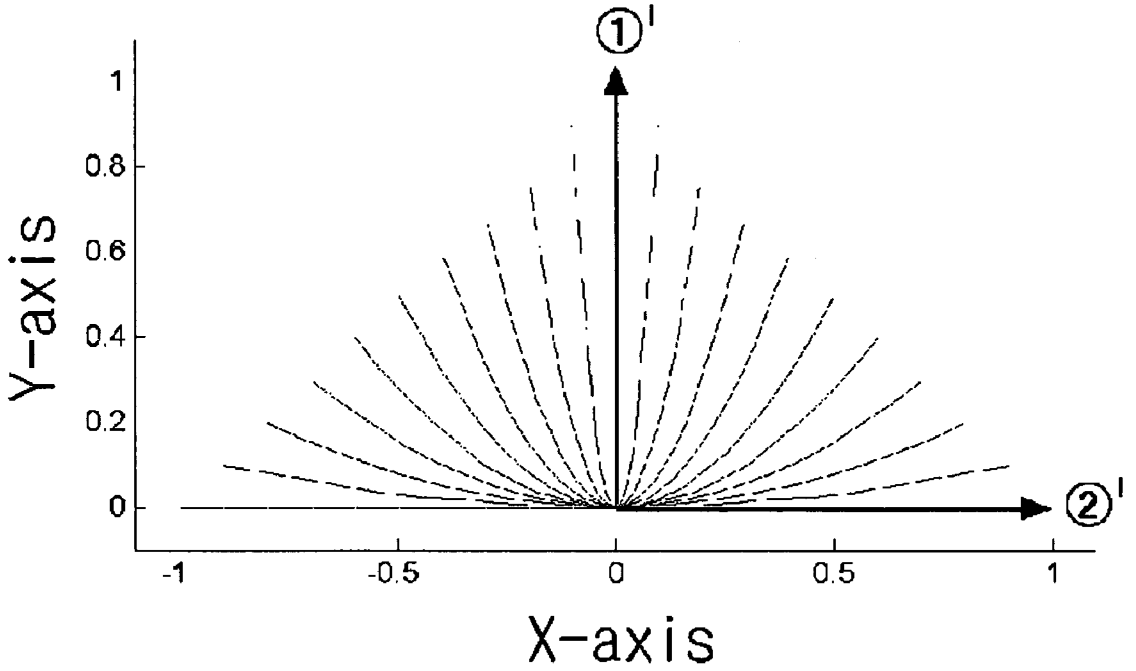
Figure 8A:
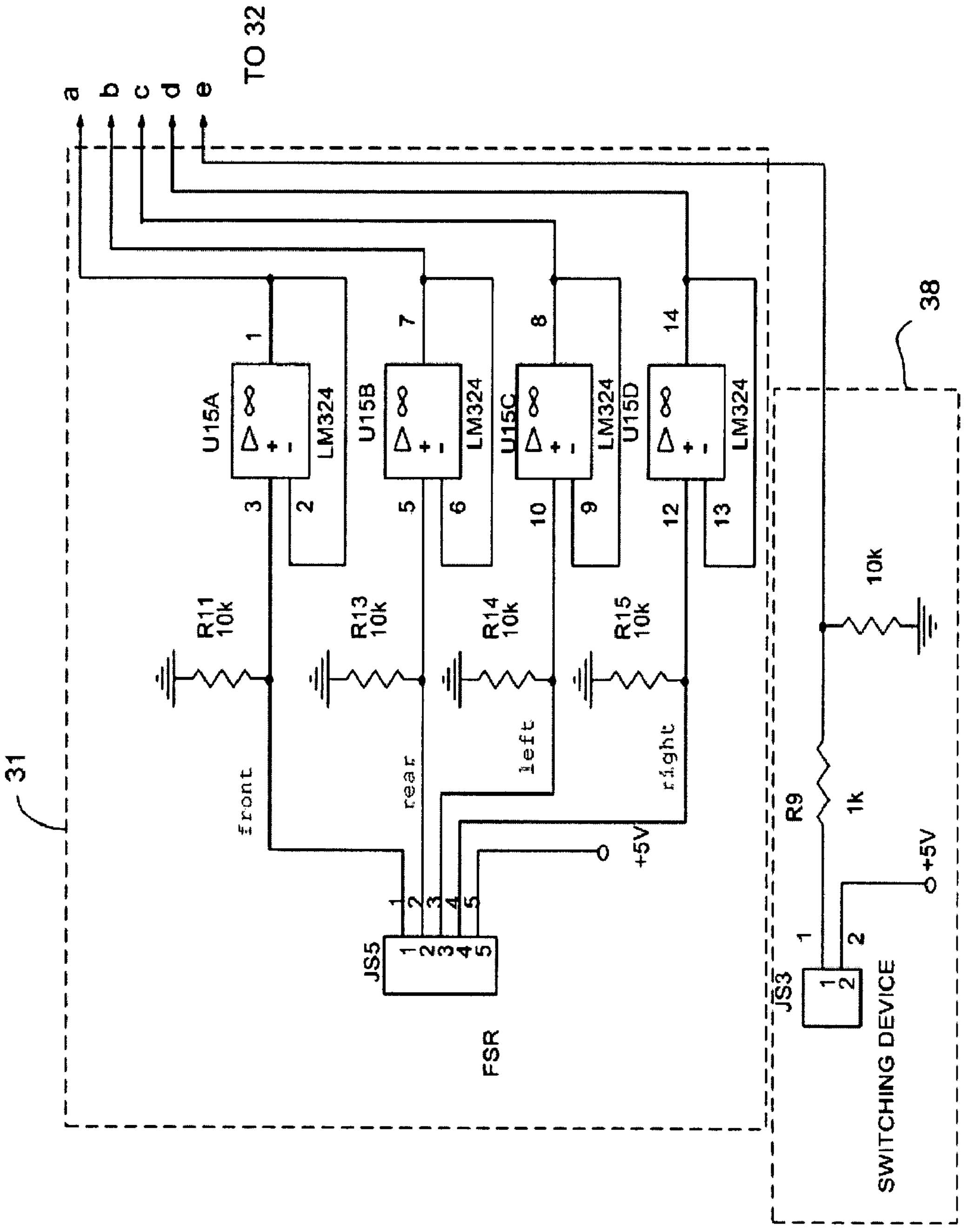
FIGS. 8A–8F are portions of a circuit diagram of the wheelchair drive control apparatus using the wheelchair control sensor in accordance with the present invention.
Figure 8B:
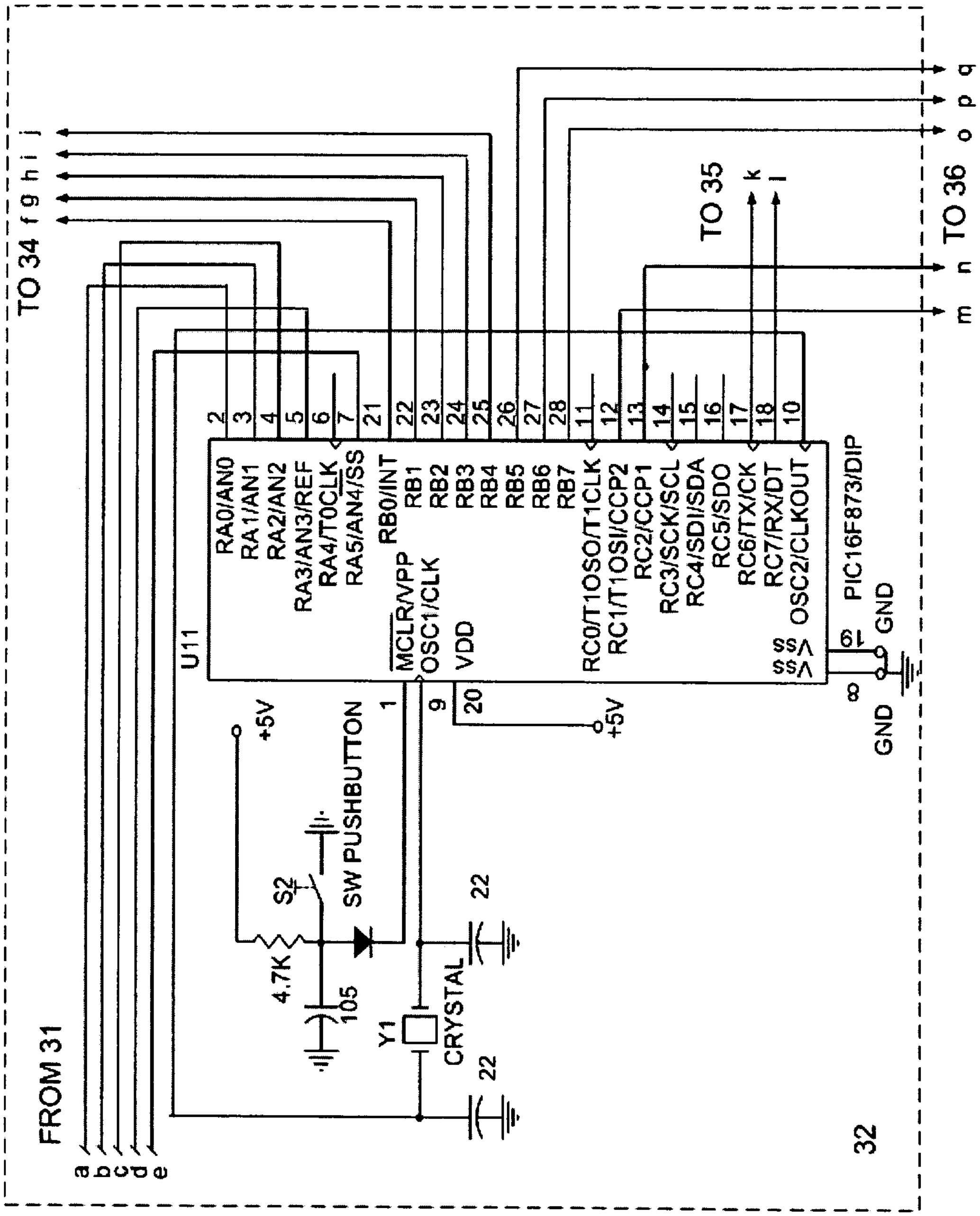
Figure 8C:
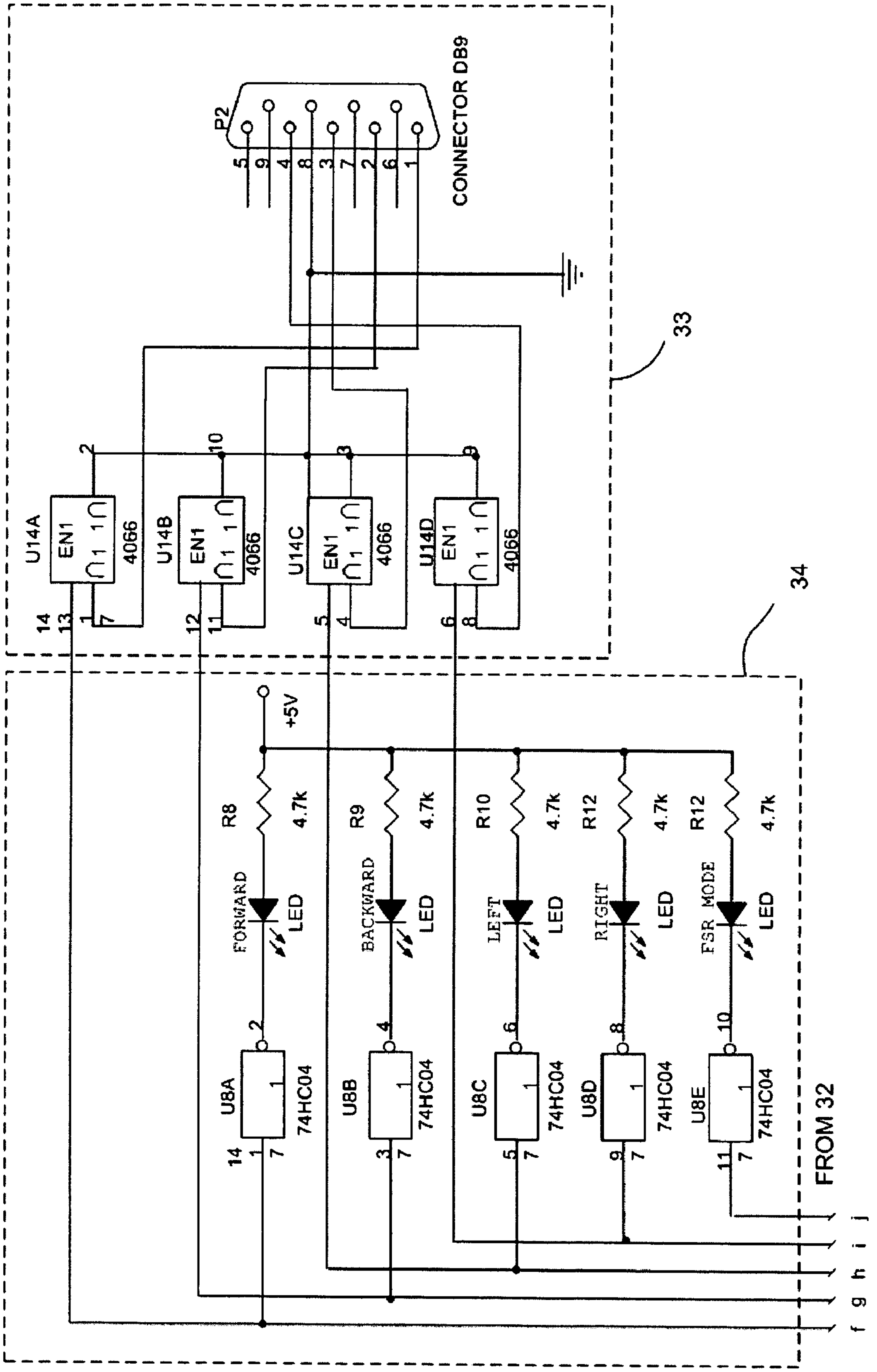
Figure 8D:
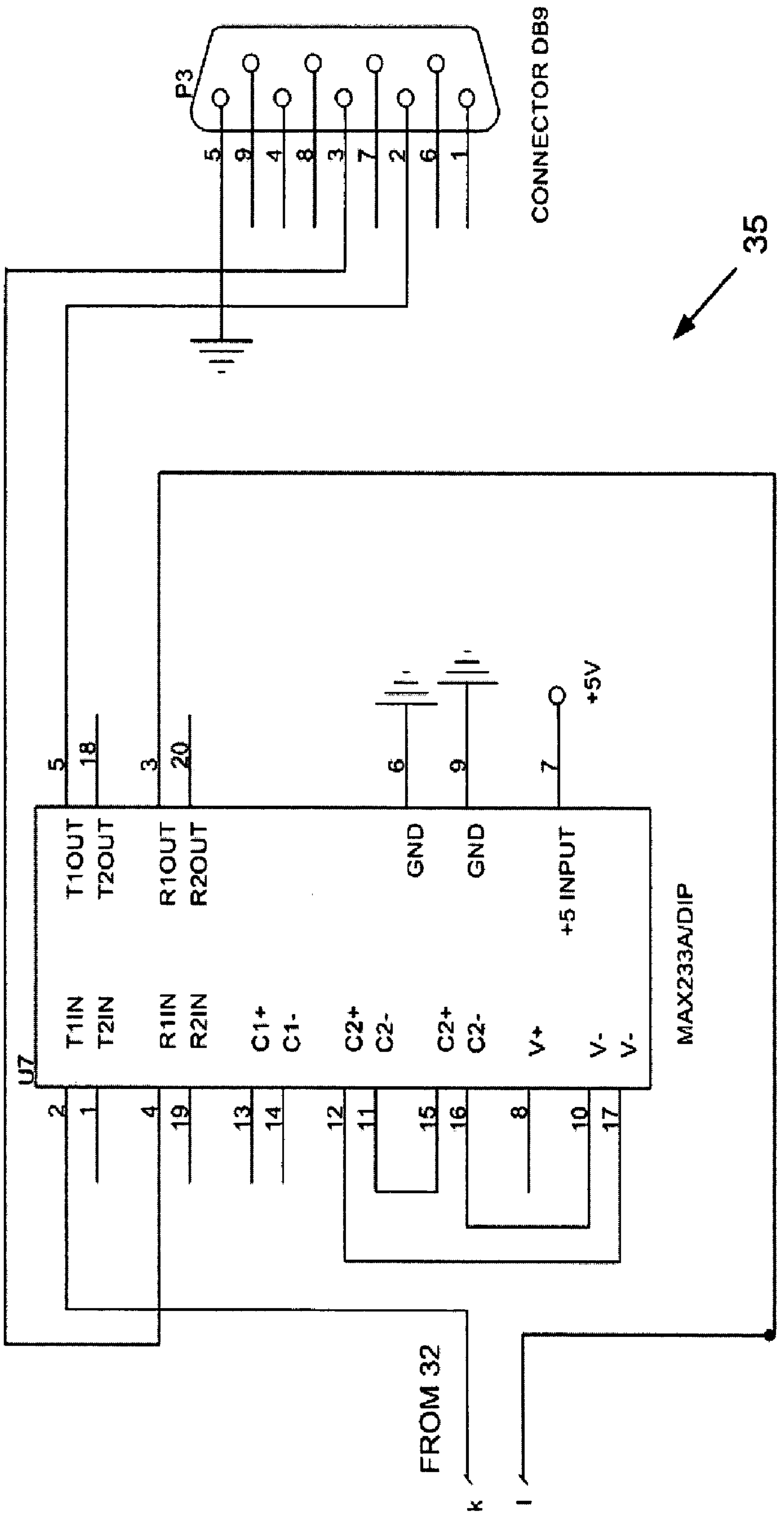
Figure 8E:
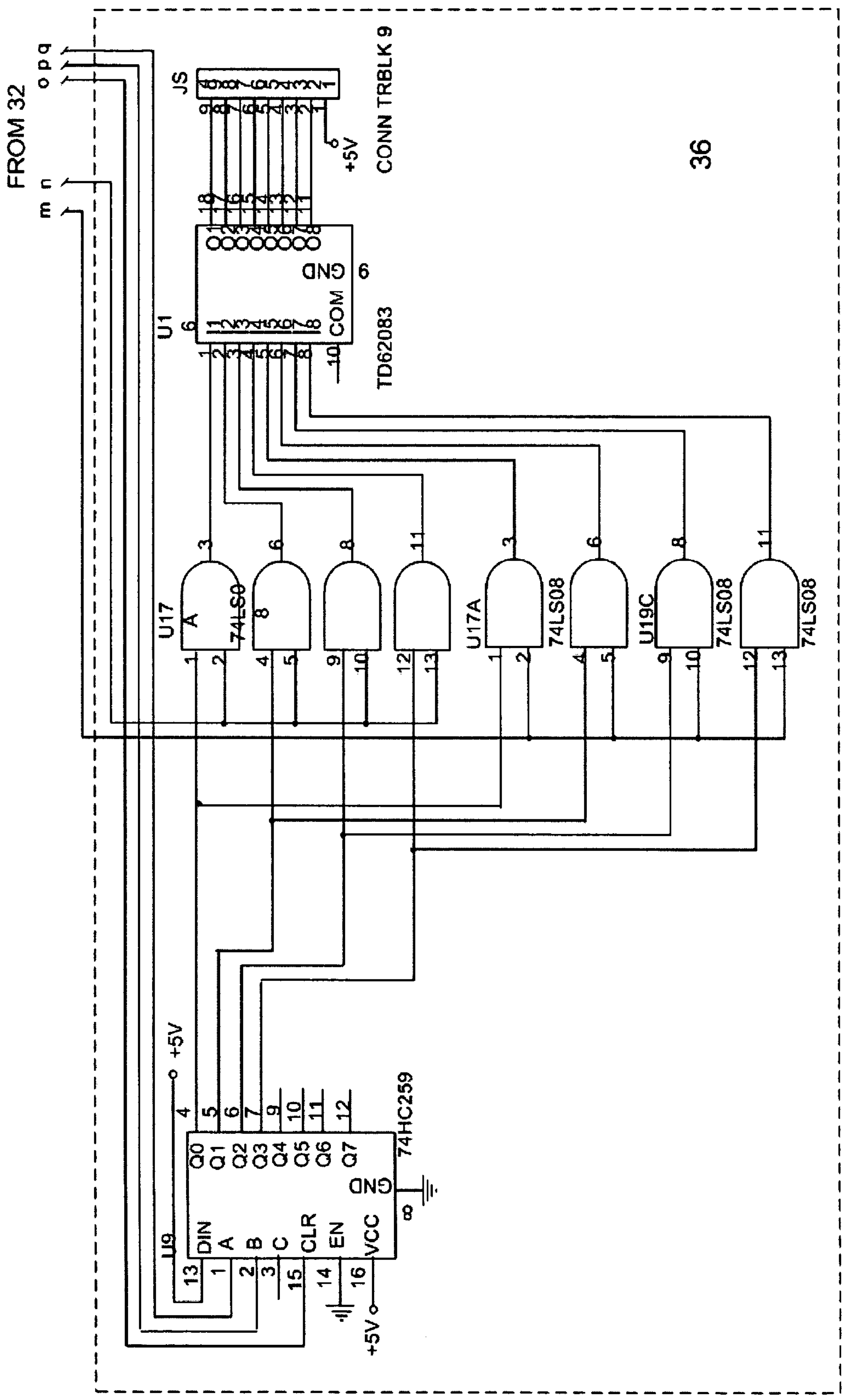
Figure 8F:
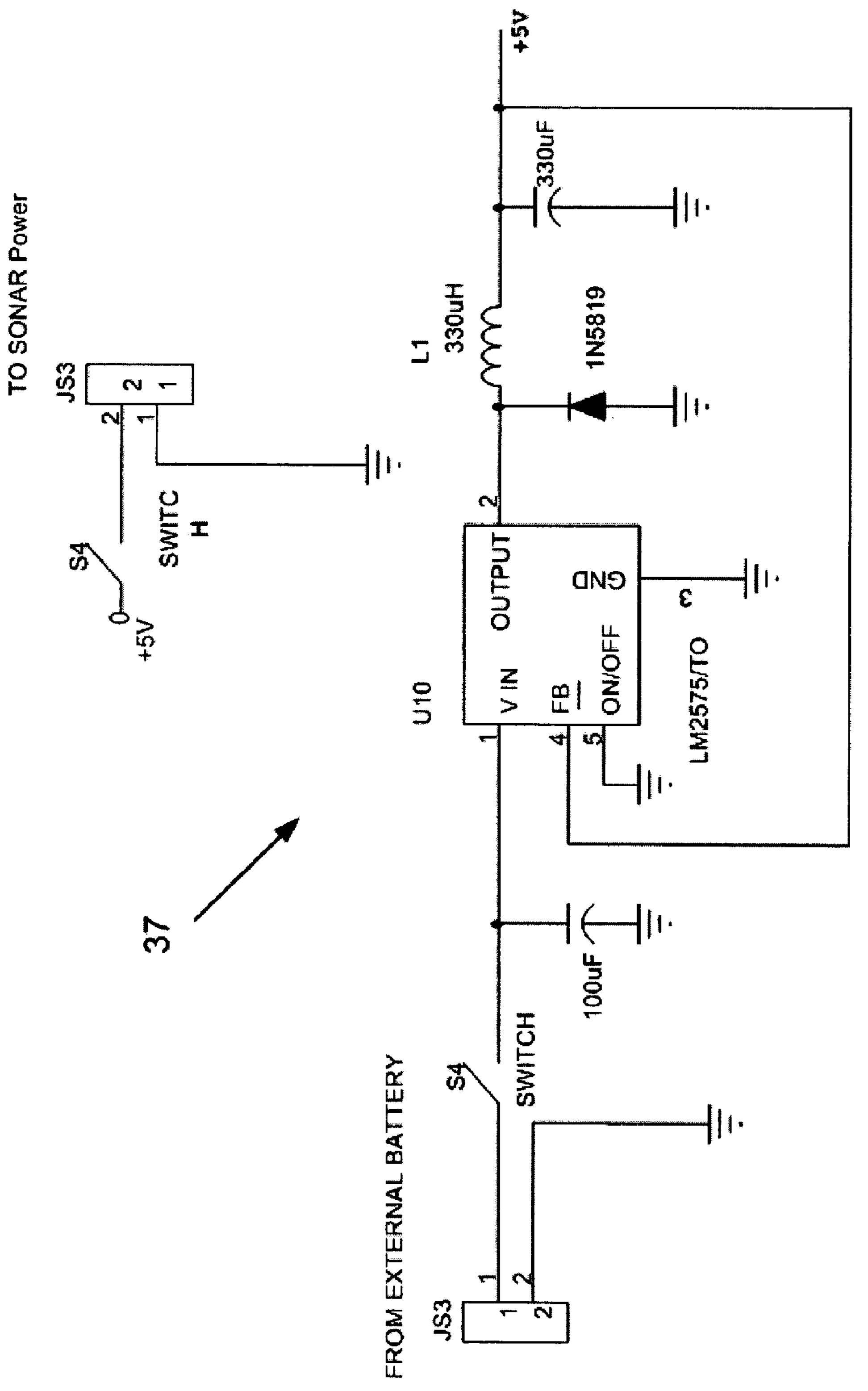

FIGS. 7*a*, 7*b* and 7*c* are graphs that compare a functional relationship for converting the movement of shoulders detected by the wheelchair control sensor of the present invention into the movement of a wheelchair and a conversional relationship for a joystick. FIG. 7*a* is a graph showing the functional relationship for converting the movement of shoulders detected by the wheelchair control sensor of the present invention into the movement of a wheelchair, in which the X-axis thereof represents the extent to which a left shoulder is raised and the Y-axis thereof represents the extent to which a right shoulder is raised. FIG. 7*b* is a graph representing the movement of shoulders detected by the wheelchair control sensor of the present invention in movement of a powered wheel chair, in which the X-axis thereof represents the velocity of the left wheel of the powered wheelchair and the Y-axis thereof represents the velocity of the right wheel of the powered wheelchair. FIG. 7*c* is a graph showing the movement of a wheelchair according to the manipulation of a conventional joystick.

As represented by line 1 and 2 in FIGS. 7*a* and 7*b*, when both shoulders are raised at the same time, the wheelchair moves forward. The higher the shoulders are raised, the faster the wheelchair moves.

In case of a joystik, as shown in the graph of FIG. 7*c*, as a joystick is pushed along a Y-axis (that is, line 1), a wheelchair moves forward, and the velocity of the forwarding movement of the wheelchair is determined according to the extent to which the joystick is pushed.

Line 1 and 2 of FIGS. 7*a* and 7*b* represents the case where a left shoulder is raised while a right shoulder is kept still. In this case, a powered wheelchair turns to the right. To make a right turn, the left wheel of the wheelchair has to rotate forward and the right wheel has to rotate backward and, therefore, a curve is formed so that an X-axis value increases and a Y-axis value decreases.

In case of a joystick, as shown in the graph of FIG. 7*c*, as a joystick is pulled in the positive direction of an X-axis (that is, line 2), a wheelchair turns to the right, and the velocity of the right turning of the wheelchair is determined according to the extent to which the joystick is pulled.

As described above, the present invention exploits the operational principle of the joystick. The horizontal movement of the joystick controls the angular velocity of the powered wheelchair and the vertical movement of the joystick controls the forward velocity of the powered wheelchair, so that the following Equations 1 and 2 can be set up.

$$Jx = \text{Sleft} - \text{Sright} \tag{1}$$

$$Jy = \text{Sleft} * \text{Sright} \tag{2}$$

In the above-described Equations 1 and 2, Jx represents the horizontal coordinates of a joystick, Jy represents the vertical coordinates of a joystick, Sleft represents the extent to which a left shoulder is raised, and Sright represents the extent to which a right shoulder is raised. Each of the parameters is standardized between 0 and 1. Since in the present invention, the movement of the shoulder is standardized between 0 and 1, a signal for moving the powered wheelchair backward cannot be generated. Accordingly, when the powered wheelchair needs to move backward, a method in which a mode is changed by quickly raising both shoulders two times may be used to generate the signal for moving the powered wheelchair backward.

The apparatus for controlling the driving of a powered wheelchair using the wheelchair control sensor constructed as described above is described below.

FIGS. 8A–8F are portions of a circuit diagram of the wheelchair drive control apparatus using the wheelchair control sensor in accordance with the present invention. As shown in FIGS. 8A–8*f*, the wheelchair drive control unit 30 of the present invention is constructed the same as a conventional wheelchair drive control unit except that a powered wheelchair is controlled according to a detection signal input from the wheelchair control sensor 10, instead of a signal input by the manipulation of a joystick. In the wheelchair drive control unit 30 of the present invention, the input signal used to control the powered wheelchair is generated based on the directions in which and the extent to which the FSR sensors 12 are pressed.

The wheelchair drive control apparatus 30 of the present invention includes a FSR signal input unit 31 for inputting the resistance values of the FSR sensors 12 of the wheelchair control sensor 10 through a voltage divider, a microcontroller 32 for analyzing the FSR signals input from the FSR signal input unit 31 using a defined algorithm and generating an appropriate wheelchair drive control signal, and a wheelchair interface unit 33 for converting the wheelchair drive control signal generated by the microcontroller 32 into a signal suitable for the control specifications of the powered wheelchair. The wheelchair drive control apparatus 30 of the present invention further includes a signal display unit 34 comprised of a light emitting diode (LED) panel for allowing a user to identify signals transmitted to the powered wheelchair, and a control computer interface unit 35 for providing an interface for the use of a control computer to supplement the function of the microcontroller 32. The wheelchair drive control apparatus 30 of the present invention further includes a wheel drive unit 36 for driving the wheels of the powered wheelchair according to the wheelchair drive control signal, a power supply unit 37 for supplying power, and an emergency stop switch unit 38 for stopping the wheelchair in case of emergency.

The wheelchair drive control apparatus 30 of the present invention constructed as described above controls the powered wheelchair using a signal input from the wheelchair control sensor 10 and the above-described component elements in the same manner as the conventional wheelchair drive control apparatus.

As described above, in accordance with the present invention, a wheelchair control sensor is worn on the upper garment of a spine cord-injured person who is incapable of moving his and her hands, measures the direction and amount of the movement of shoulders and controls a powered wheelchair, so that the injured person conveniently controls the powered wheelchair without being concerned about its appearance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wheelchair control sensor for controlling a powered wheelchair for a user who is incapable of using their hands, comprising:

two casings each including an internal space having an inclined surface;

two force sensitive resistor (FSR) sensors attached to the inclined surfaces of the casings or surfaces opposite to the inclined surfaces;

pressing balls to press the FRS sensors while being moved through the internal spaces of the casings by external forces;

two shoulder straps for providing the external forces to the pressing balls according to movements of a user's shoulders; and a waist belt to be worn on an upper body of the user with the two casings spaced apart from each other at a certain interval.

2. The wheelchair control sensor as set forth in claim 1, wherein each of the inclined surfaces has a uniform width.

3. The wheelchair control sensor as set forth in claim 1, wherein each of the shoulder straps is connected to the pressing ball at a first end thereof and secured to the waist belt at a second end thereof.

4. A wheelchair drive control apparatus for receiving a detection signal from a wheelchair control sensor, which controls a powered wheelchair for spinal cord-injured persons using movement of shoulders, and controlling operation of wheels of the powered wheelchair, the wheelchair control sensor comprising:

two casings each including an internal space having an inclined surface;

two force sensitive resistor (FSR) sensors attached to the inclined surfaces of the casings or surfaces opposite to the inclined surfaces;

pressing balls to press the FRS sensors while being moved through the internal spaces of the casings by external forces;

two shoulder straps for providing the external forces to the pressing balls according to movements of a user's shoulders; and a waist belt to be worn on an upper body of the user with the two casings spaced apart from each other at a certain interval.

* * * * *